(12) United States Patent
Christenson et al.

(10) Patent No.: US 8,578,055 B2
(45) Date of Patent: *Nov. 5, 2013

(54) PROPOGATION OF DNS SERVER IP ADDRESSES IN A PRIVATE NETWORK

(75) Inventors: David A. Christenson, Fergus Falls, MN (US); Christopher T. Gloe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 493 days.

This patent is subject to a terminal disclaimer.

(21) Appl. No.: 12/499,898

(22) Filed: Jul. 9, 2009

(65) Prior Publication Data

US 2011/0010463 A1    Jan. 13, 2011

(51) Int. Cl.
*G06F 13/00* (2006.01)
(52) U.S. Cl.
USPC ........................... 709/245; 709/220; 709/221
(58) Field of Classification Search
USPC .................. 709/220–224, 245, 203
See application file for complete search history.

(56) References Cited

U.S. PATENT DOCUMENTS

| | | | |
|---|---|---|---|
| 6,421,732 B1 | 7/2002 | Alkhatib et al. | |
| 6,463,061 B1 | 10/2002 | Rekhter et al. | |
| 6,563,823 B1 | 5/2003 | Przygienda et al. | |
| 6,834,302 B1 | 12/2004 | Harvell | |
| 7,359,933 B1 | 4/2008 | Polen et al. | |
| 7,496,685 B2 | 2/2009 | Chen et al. | |
| 7,562,153 B2 | 7/2009 | Biliris et al. | |
| 7,633,855 B2 | 12/2009 | Singh et al. | |
| 7,702,808 B2 | 4/2010 | Wiget et al. | |
| 7,797,410 B2 | 9/2010 | Westerdal | |
| 7,904,535 B2* | 3/2011 | Luo et al. | 709/223 |
| 7,937,471 B2* | 5/2011 | Alkhatib et al. | 709/226 |
| 8,140,669 B2* | 3/2012 | Christenson et al. | 709/224 |
| 2002/0016926 A1* | 2/2002 | Nguyen et al. | 713/201 |
| 2002/0078233 A1 | 6/2002 | Biliris et al. | |
| 2002/0093915 A1* | 7/2002 | Larson | 370/235 |
| 2003/0028671 A1 | 2/2003 | Mehta et al. | |
| 2003/0233454 A1* | 12/2003 | Alkhatib et al. | 709/226 |
| 2005/0030956 A1 | 2/2005 | Lord et al. | |
| 2005/0286514 A1 | 12/2005 | Cheshire et al. | |
| 2006/0031385 A1 | 2/2006 | Westerdal | |
| 2006/0041650 A1* | 2/2006 | Luo et al. | 709/223 |
| 2007/0097992 A1 | 5/2007 | Singh et al. | |
| 2009/0113521 A1 | 4/2009 | Engdahl et al. | |
| 2010/0325240 A1 | 12/2010 | Drako et al. | |
| 2011/0010413 A1 | 1/2011 | Christenson et al. | |
| 2011/0055374 A1* | 3/2011 | Christenson et al. | 709/224 |
| 2011/0196945 A1* | 8/2011 | Alkhatib et al. | 709/220 |

* cited by examiner

*Primary Examiner* — Kenneth R Coulter
(74) *Attorney, Agent, or Firm* — James R. Nock

(57) ABSTRACT

Systems, methods and articles of manufacture are disclosed for updating IP addresses on a private network. A DNS server receives an updated IP address and stores both the updated IP address and an old IP address. The DNS server includes the updated IP address in responses to all DNS query requests, wherein the DNS query requests are to the old IP address. Further, the DNS server deletes the old IP address and updates the DNS server network settings with the updated IP address after every remote client on the private network has stored the updated IP address.

12 Claims, 7 Drawing Sheets

160

DNS SERVER LIST

| DOMAIN NAME | IP ADDRESS | SERIAL NUMBER | TTL |
| --- | --- | --- | --- |
| .ibmb001.ibmb.bluenet | 10.0.1.101 | LKVDZF7 | 4 HOURS |
| .ibmb002.ibmb.bluenet | 10.0.2.102 | LKVDZD8 | 2 HOURS |

FIG. 1B

PROPOGATION OF DNS SERVER IP ADDRESSES IN A PRIVATE NETWORK

BACKGROUND OF THE INVENTION

1. Field of the Invention

The field of invention relates to Domain Name System (DNS) servers on a private network. In particular, the field of invention relates to the automatic update of IP addresses on a private network.

2. Description of the Related Art

For many businesses, updating one or more IP addresses in a private network can quickly become a nontrivial task. Indeed, small and medium-sized businesses lacking competent network administrators may find the process of modifying IP addresses burdensome, overwhelming, and extremely disruptive. The problem becomes particularly acute when the change is to the IP address of a DNS server, wherein the DNS server is the central source for locating other resources and services on the network. As these DNS servers proliferate in number, modifications to a DNS server IP address becomes more likely and propagating updates to the entire network more complex. The challenge for small and medium-sized businesses is that such changes are a part of maintaining a private network.

An alternative to manually updating the IP addresses associated with DNS servers distributed across a network is Dynamic Host Configuration Protocol (DHCP). With DHCP, network devices like client computers are in regular communication with a DHCP server that leases IP addresses to the client computers for a set period of time. In addition to the leased IP address, network devices also often receive the DNS server IP address from the DHCP server and remain updated as DNS server IP addresses change. The problem with DHCP is that DHCP server setup and management is also nontrivial making it an unsuitable alternative for many small to medium-sized businesses.

Another alternative to manually updating IP addresses is multicast DNS. With multicast DNS, each network device on the private network stores a local copy of its own IP-to-hostname mapping and discovers new IP addresses for unknown hostnames by broadcasting the unknown hostname, often referred to as IP multicast, and waiting for a response from the network device with a matching hostname. A significant limitation of multicast DNS is that hostname resolution can only be done between devices on a shared local area network (LAN) segment making it unsuitable for most small to medium-sized business networks.

Thus, there is a need for an autonomous IP address modification system that does not require a DHCP server and that spans multiple LAN segments.

SUMMARY OF THE INVENTION

One embodiment of the invention includes a computer implemented method for updating IP addresses on a private network. The method comprises receiving an updated IP address on a private DNS server to replace an old IP address; storing the old IP address on the private DNS server; receiving a DNS query from a remote client addressed to the old IP address associated with the private DNS server, wherein the DNS query is a check for an IP address change; responding to the remote client with the updated IP address; and deleting the old IP address from the private DNS server after all remote clients have stored the updated IP address.

Another embodiment of the invention includes a computer readable storage medium containing a program which, when executed, performs an operation for modifying IP addresses on a private network. The operation may generally include receiving an updated IP address on a private DNS server to replace an old IP address; storing the old IP address on the private DNS server; receiving a DNS query from a remote client addressed to the old IP address associated with the private DNS server; wherein the DNS query is a check for an IP address change; responding to the remote client with the updated IP address; and deleting the old IP address from the private DNS server after all remote clients have stored the updated IP address.

Still another embodiment of the invention includes a system having a processor and a memory containing a program, which when executed by the processor is configured to perform an operation for modifying IP addresses on a private network. The operation may generally include receiving an updated IP address on a private DNS server to replace an old IP address; storing the old IP address on the private DNS server; receiving a DNS query from a remote client addressed to the old IP address associated with the private DNS server; wherein the DNS query is a check for an IP address change; responding to the remote client with the updated IP address; and deleting the old IP address from the private DNS server after all remote clients have stored the updated IP address.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 1B is a detailed description of the DNS server list of FIG. 1A.

DETAILED DESCRIPTION OF THE PREFERRED EMBODIMENTS

Figure 1A:
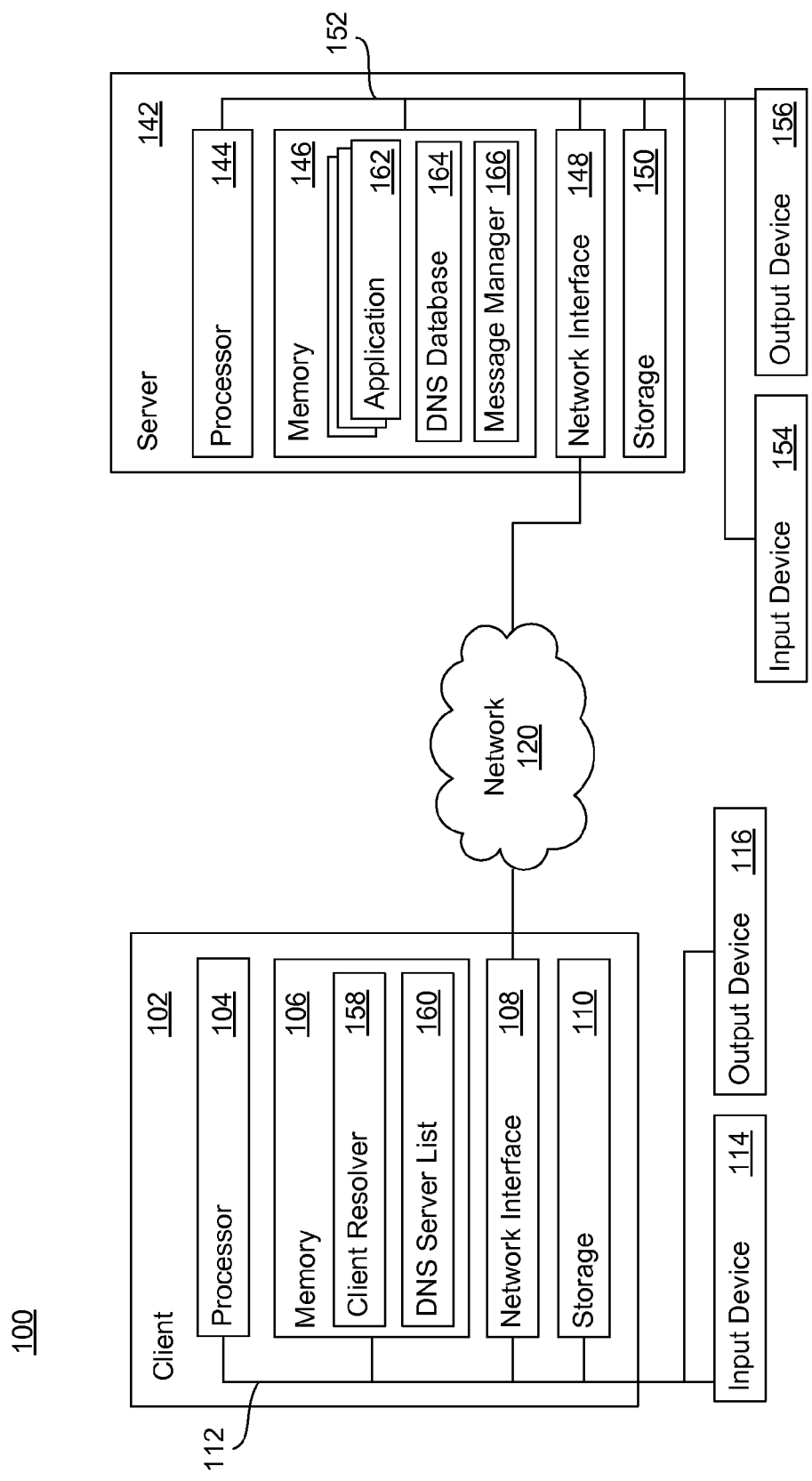
FIG. 1A is a block diagram illustrating an embodiment of a system for updating IP addresses on a private network.
Figure 2:
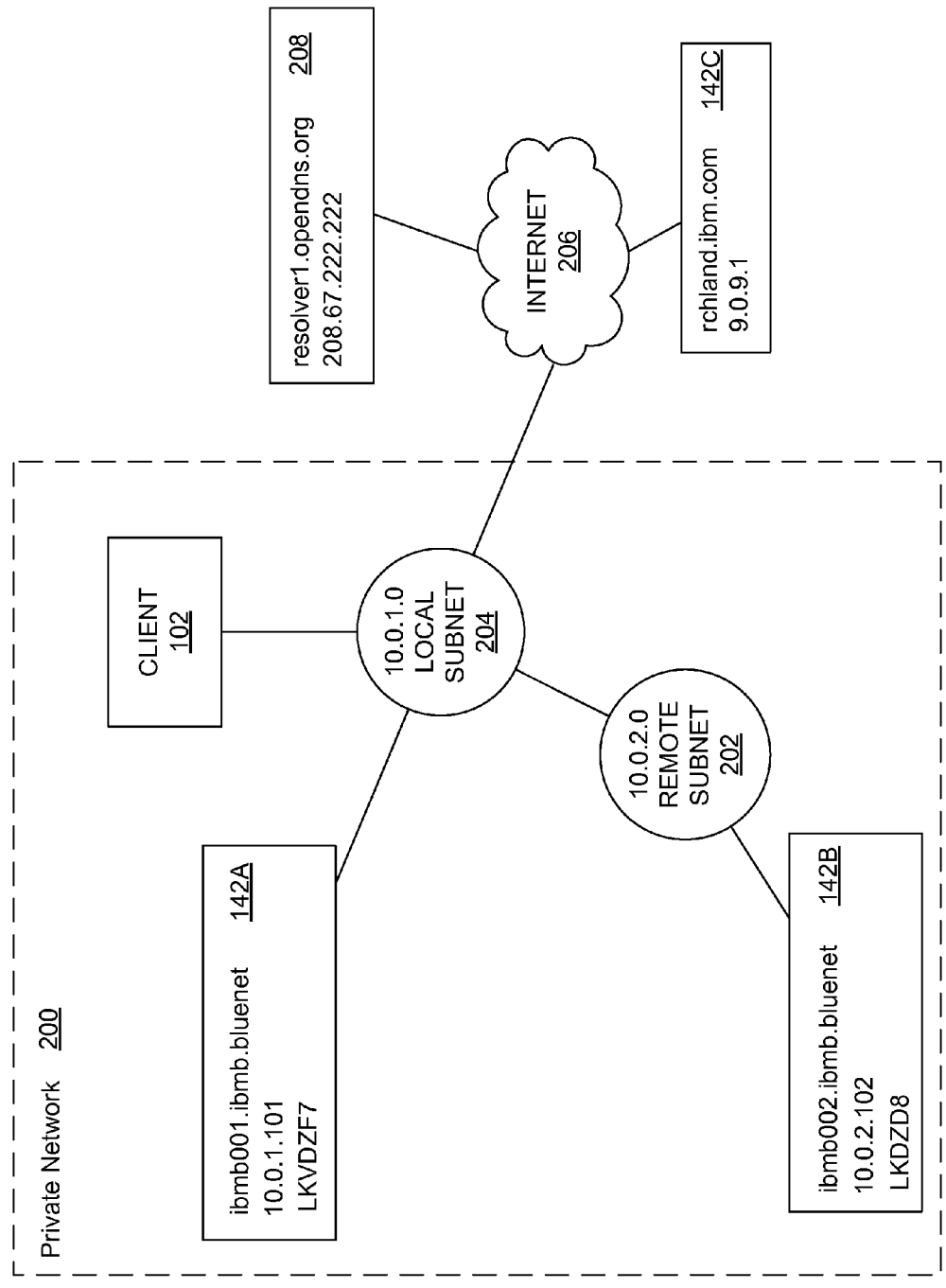
FIG. 2 is a block diagram illustrating an example of an embodiment of the client configured to retrieve IP address updates periodically from each of the servers on the private network.

FIG. 1A is a block diagram illustrating an embodiment of a system 100 for updating IP addresses on a private network. The networked system 100 includes a client computer 102 (client) and a server computer 142 (server). The client 102 and the server 142 are connected via a network 120. In a particular embodiment, the network 120 is a private network with a distributed DNS server configuration as illustrated in FIG. 2.

The client 102 generally includes a processor 104 connected via a bus 112 to a memory 106, a network interface device 108, a storage 110, an input device 114, and an output device 116. The client 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

As shown, the memory 106 includes a client resolver 158 and a DNS server list 160. The client resolver 158, when executed on processor 104, retrieves information associated with a received hostname query and keeps the DNS server list 160 current. The DNS server list 160 is configured to keep a record of each DNS server on the private network, as described in further detail in FIG. 1C. In an alternative embodiment, the DNS server list 160 is stored in storage 110.

The storage 110 may be a hard disk drive storage device. Although the storage 110 is shown as a single unit, the storage 110 may be a combination of fixed and/or removable storage devices, such as fixed disc drives, floppy disc drives, tape drives, removable memory cards, or optical storage. The memory 106 and the storage 110 may be part of one virtual address space spanning multiple primary and secondary storage devices.

The input device 114 may be any device for providing input to the client 102. For example, a keyboard, keypad, light pen, touch-screen, track-ball, or speech recognition unit, audio/video player, and the like may be used.

The output device 116 may be any device for providing output to a user of the client 102. For example, the output device 116 may be any conventional display screen or set of speakers, along with their respective interface cards, i.e., video cards and sound cards.

The server 142 generally includes a processor 144 connected via a bus 152 to a memory 146, a network interface device 148, a storage 150, an input device 154, and an output device 156. The processor 144 could be any hardware processor used to perform an embodiment of the invention.

Like the memory 106, the memory 146 may be a random access memory sufficiently large to hold the necessary programming and data structures of the invention. The programming and data structures may be accessed and executed by the processor 144 as needed during operation. While the memory 146 is shown as a single entity, it should be understood that the memory 146 may in fact comprise a plurality of modules, and that the memory 146 may exist at multiple levels, from high speed registers and caches to lower speed but larger DRAM chips.

As shown, the memory 146 includes one or more hosted applications 162, available to one or more clients 102 on the private network. In addition, as shown, the memory includes a message manager 166 as described in further detail in FIG. 1D and a DNS database 164, wherein each DNS database includes a list of application hostnames for applications installed on the server 142. In an alternative embodiment, the DNS database 160 is stored in storage 150.

Like the network interface device 108, the network interface device 148 may be any entry/exit device configured to allow network communications between the client 102 and the server 142 via the network 120. For example, the network interface device 148 may be a network adapter or other network interface card (NIC).

Like the storage 110, the storage 150 may be a hard disk storage device. Although the storage 150 is shown as a single unit, the storage 150 may be a combination of fixed and/or removable storage devices, such as fixed disc drives, floppy disc drives, tape drives, removable memory cards, or optical storage. The memory 146 and the storage 150 may be part of one virtual address space spanning multiple primary and secondary storage devices.

Like the input device 114, the input device 154 may be any device for providing input to the client 102. For example, a keyboard, keypad, light pen, touch-screen, track-ball, or speech recognition unit, audio/video player, and the like may be used.

Like the output device 116, the output device 156 may be any device for providing output to a user of the server 142. For example, the output device 156 may be any conventional display screen or set of speakers, along with their respective interface cards, i.e., video cards and sound cards.

FIG. 1B provides an illustrative example of the DNS server list 160 of FIG. 1A. Table I provides one embodiment of the structure of the DNS server list 160:

TABLE I

DNS Server List Structure

| Domain Name: | Primary hostname of the server |
|---|---|
| IP Address: | IP address used to contact server |
| Serial Number: | Unique persistent serial number used to identify a DNS server |
| Time to Live: | Time to live (default 4 hours) |

Each client 102 in the private network is configured to store the DNS server list 160. In the present example, the DNS server list maintains a record of all DNS servers on the private network, wherein the record includes a domain name that describes a primary hostname of the server. The record also includes an IP address associated with the primary hostname of the server and a unique persistent serial number to identify the server. The record also includes a "time to live" (TTL), wherein the TTL indicates to the client resolver 158 when to update a particular record as described in further detail in FIG. 1C.

In an alternative embodiment, the record may also include a last communication date, wherein the last communication date is the date of the last client-server communication and indicates to the client resolver 158 the possibility of an outdated IP address. Those skilled in the art will appreciate similar additional record elements that may be useful for predicting connection problems and keeping each record entry current.

Further, in the present example illustrated in FIG. 1B, domain name .ibmb001.ibmb.bluenet is associated with IP address 10.0.1.101, serial number LKVDZF7, and a TTL of 4 hours. The client resolver 158 on the client 102 is configured to retrieve a most recent IP address from the server 142 associated with ibmb001.ibmb.bluenet after the elapsed 4 hour TTL period. Similarly, the client resolver 158 is configured to retrieve the most recent IP address from the server 142 associated with ibmb002.ibmb.bluenet the elapsed 2 hour TTL period.

Figure 1C:
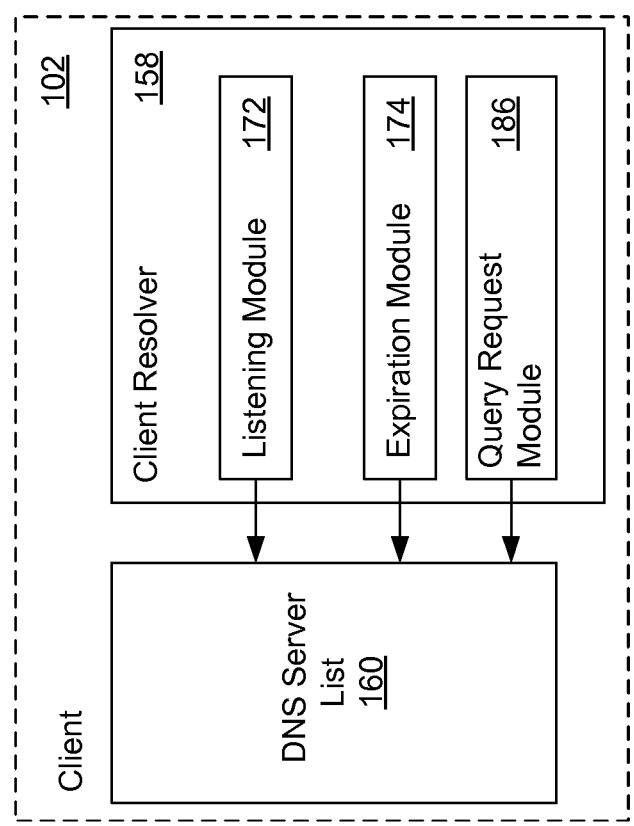
FIG. 1C is a block diagram illustrating a functional view of a client resolver, according to one embodiment of the invention.

FIG. 1C is a block diagram illustrating a functional view of the client resolver 158, according to one embodiment of the invention. As shown, the client resolver 158 includes a listening module 172, an expiration module 174, and a query manager 186.

In one embodiment, the listening module 172 is configured to browse the LAN segment for IP update broadcasts, wherein the IP update broadcast includes data necessary to update a record in the DNS server list 160. For example, the IP update broadcast includes a serial number and an updated IP address for the server transmitting the broadcast (hereinafter "broadcasting server"). The IP update broadcast may also optionally include an updated domain name and TTL.

Upon receiving an IP update broadcast, the listening module 172 is configured to update the record associated with the serial number in the DNS server list 160. The update includes at least replacing the IP address in the record with the updated IP address. In an alternative embodiment, the listening module 172 is also configured to send the broadcasting server a confirmation response, wherein the confirmation response indicates that the IP address associated with the broadcasting server was updated in the DNS server list 160 on the client 102.

In one embodiment, the expiration module 174 is configured to monitor the TTL for each IP address stored in the DNS server list 160. The expiration module 174 is further configured to send a DNS query request to each IP address with an expired TTL. The expiration module 174 is further configured to receive a DNS query response packet, wherein the DNS query response packet includes data necessary to update a record in the DNS server list 160. For example, the DNS query response packet includes a serial number for uniquely identifying the server sending the DNS query response packet (hereinafter "responding server") and an IP address refresh, wherein the IP address refresh is the most recent IP address associated with the responding server. The DNS query response packet may also optionally include an updated domain name and a TTL, wherein the TTL is defined by the responding server. In an alternative embodiment, the TTL for a particular record is not included in the DNS query response packet and is instead determined by the client resolver 158.

The expiration module 174 is further configured to update the record in the DNS server list 160 associated with the serial number received in the DNS query response packet. In one embodiment, the update includes replacing the IP address in the record with the IP address refresh. In an alternative embodiment, the expiration module 174 is configured to replace the IP address in the record only if the IP address refresh is different from the IP address stored on the DNS server list 160.

In yet another embodiment, the expiration module 174 is also configured to send the responding server a client confirmation response, wherein the client confirmation response indicates that the IP address associated with the server 142 was updated in the DNS server list 160 on the client 102. For example, the DNS query request sent from the client may include an associated client ID stored in a header field that enables the server to identify the client and update the appropriate client record in a stored list of remote clients, wherein a remote client is a client that resides on a remote subnet.

In one embodiment, the query request module 186 is configured to send DNS query request to a server on the private network. The query request module 186 is further configured to receive DNS query responses from the servers on the private network and inspect the responses for an IP address update indicator, wherein the IP address update indicator signals to the query response module 186 that the responding server has an updated IP address. The query request module 186 is configured to store the updated IP address along with the serial number for the server in the DNS server list 160. The query request module 186 may be further configured to send a client confirmation response.

Figure 1D:
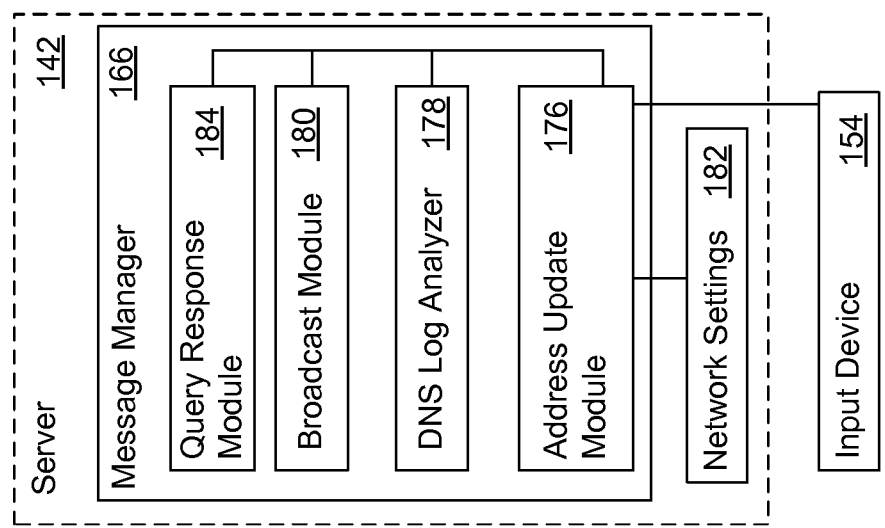
FIG. 1D is a block diagram illustrating a functional view of a message manager, according to one embodiment of the invention.

FIG. 1D is a block diagram illustrating a functional view of the message manager 116, according to one embodiment of the invention. As shown, the message manager 166 includes an address update module 176, a DNS log analyzer 178, a broadcast module 180, and a query response module 184.

In one embodiment, the address update module 176 is configured to store an IP address associated with the server hosting the update module 176 and is configured to receive each IP address update (hereinafter "updated IP address"). The address update module 176 is further configured to store the updated IP address and the IP address to be replaced by the updated IP address (hereinafter "old IP address"). The address update module 176 is configured to update the network settings 182 on the server 142 and delete the old IP address after all remote clients in the private network have stored the updated IP address.

In one embodiment, the address update module 176 may be configured to positively determine that all remote clients have stored the updated IP address after an elapsed time period, wherein the time period is defined, for example, by the system administrator. In an alternative embodiment, the address update module 176 may be configured to automatically define the time period based on the latest expiring TTL on the private network, in those embodiments where the server defines the TTL for all clients on the private network.

In an alternative embodiment, the address update module 176 is configured to maintain a list of all remote clients (hereinafter "remote client list") and further configured to receive client confirmation responses after each remote client in the remote client list has stored the updated IP address. In one embodiment, the remote client list may be generated by the DNS log analyzer 178, wherein the DNS log analyzer analyzes a DNS log file and generates a list of all unique client systems that have previously communicated with the server 142. The address update module 176 is further configured to send the updated IP address to the broadcast module 180 to update the clients on the local subnet (hereinafter "local clients") and is configured to send the updated IP address to the query response module 184 to embed the updated IP address in query responses. In such an embodiment, the address update module 176 is configured to delete the old IP address after each remote client on the remote client list has confirmed storing the updated IP address.

In yet another embodiment, the address update module 176 is configured to send the updated IP address to each of the remote clients in the remote client list, instead of waiting for communication from the remote clients. The address update module is configured to delete the old IP address after it has received client confirmation responses from all remote clients and after the user defined TTL has expired.

In one embodiment, the broadcast module 180 is configured to send an IP update broadcast with the updated IP address and the associated serial number of the server 142 out onto the local subnet. In one embodiment, the broadcast module 180 may be configured to continue to broadcast periodically for a set time as defined by a system administrator. In an alternative embodiment, the broadcast module 180 may be configured to continue to periodically broadcast until the broadcast module 180 receives a notification from the address update module 176 that all local clients have stored the updated IP address, as determined by client confirmation responses received by the address update module 176 from the local clients.

In one embodiment, the query response module 184 is configured to respond to DNS query requests from clients on the private network. The query response module 184 is further configured to include the updated IP address, provided by the address update module 176, in responses to all DNS query requests, wherein the DNS query requests are to the old IP address. It should be noted that the query response module 184 may be configured to respond to DNS query requests to both the old IP address and the new IP address until all clients have been updated with the new IP address.

FIG. 2 is a block diagram illustrating an example of an embodiment of a private network 200 with a distributed DNS server configuration, wherein the client is configured to retrieve IP address updates periodically from each of the servers on the private network. The private network 200 is a variation of the networked system illustrated in FIG. 1A. The private network 200 includes the client 102 connected via a network to a plurality of servers.

In the present example, the private network includes server ibmb001.ibmb.bluenet 142A (ibmb001), wherein server ibmb001 is associated with IP address 10.0.1.101 and serial number LKVDZF7, and server ibmb002.ibmb.bluenet 142B (ibmb002), wherein server ibmb002 is associated with IP address 10.0.2.102. Server 142A is connected to the client 102 via local subnet 204 and server ibmb002 142B is connected to the client 102 via remote subnet 202 via local subnet 204. The private network also includes a network connection to server rchland.ibm.com 142C (rchland), associated with IP address 9.0.9.1, and a default DNS server resolver1.opendns.org 208 (default DNS server), associated with IP address 208.67.222.222, connected via the Internet 206 via local subnet 204.

At TTL expiration the client 102 retrieves the current IP addresses directly from each of the one or more servers. In addition, the client 102 is configured to retrieve the current IP addresses from remote private network servers accessible only via the internet and thus requiring a virtual private network connection (VPN). For example, server rchland 142C is accessible only via a VPN connection, wherein the VPN connection transmits encapsulated packets between a VPN client and server, and wherein the packets are constructed in a particular VPN protocol format and encapsulated within some other base or carrier protocol. The client 102 routes requests to server rchland 142C to IP address "9.0.9.1", wherein IP address "9.0.9.1" is redirected to a VPN DNS server and subsequently routed to server rchland 142C.

Figure 3:
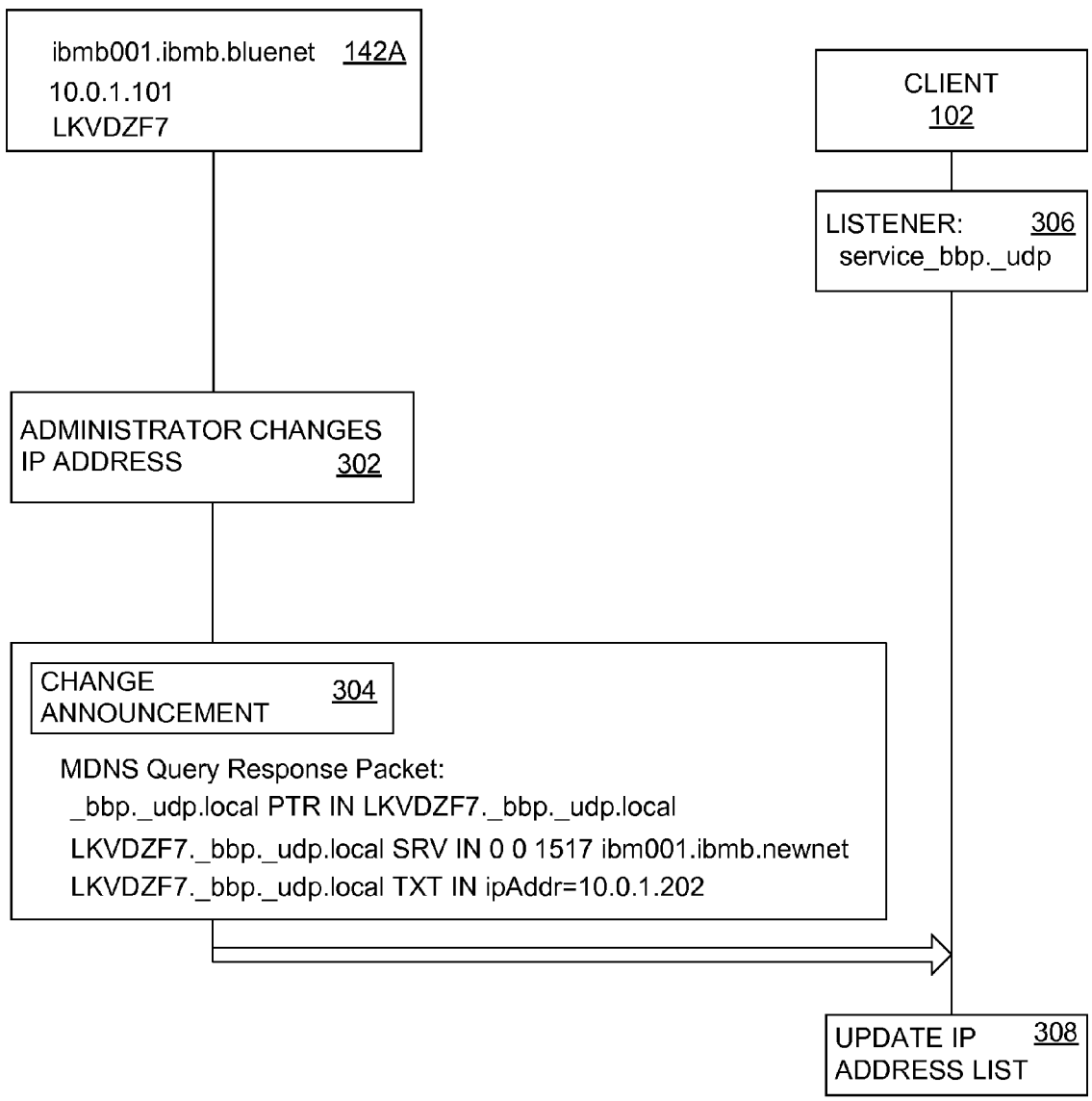
FIG. 3 is a block diagram illustrating an example of an embodiment of the operation of an IP address update on the local LAN segment of the private network.

FIG. 3 is a block diagram illustrating an example of an embodiment of the operation of an IP address update on the local subnet of the private network. As described in FIG. 1C, each client 102 on the local subnet includes a listening module 172, wherein the listening module 172 is configured to browse for service announcements on the local subnet. In the present example, the clients on the private network are configured to execute the listening module 172 that launches a listener 306 to browse for a pre-identified service announcement. As shown in this example, the listener 306 is configured to browse for "_bbp._udp" on the local subnet. Those skilled in the art will appreciate that alternative messages may be similarly implemented to indicate an IP address update.

The server 142A on the local subnet is configured to broadcast changes to the IP address associated with the server 142A. For example, at block 302 the administrator changes the IP address from 10.0.1.101 to 10.0.1.202. The server broadcasts a change announcement 304, wherein the change announcement broadcasts the IP address change using the multicast DNS protocol (mDNS). The client 102 identifies the service "_bbp._udp" in the server broadcast and updates the IP address list 308 in the client DNS server list by executing the address update module 176 of FIG. 1D.

Figure 4:
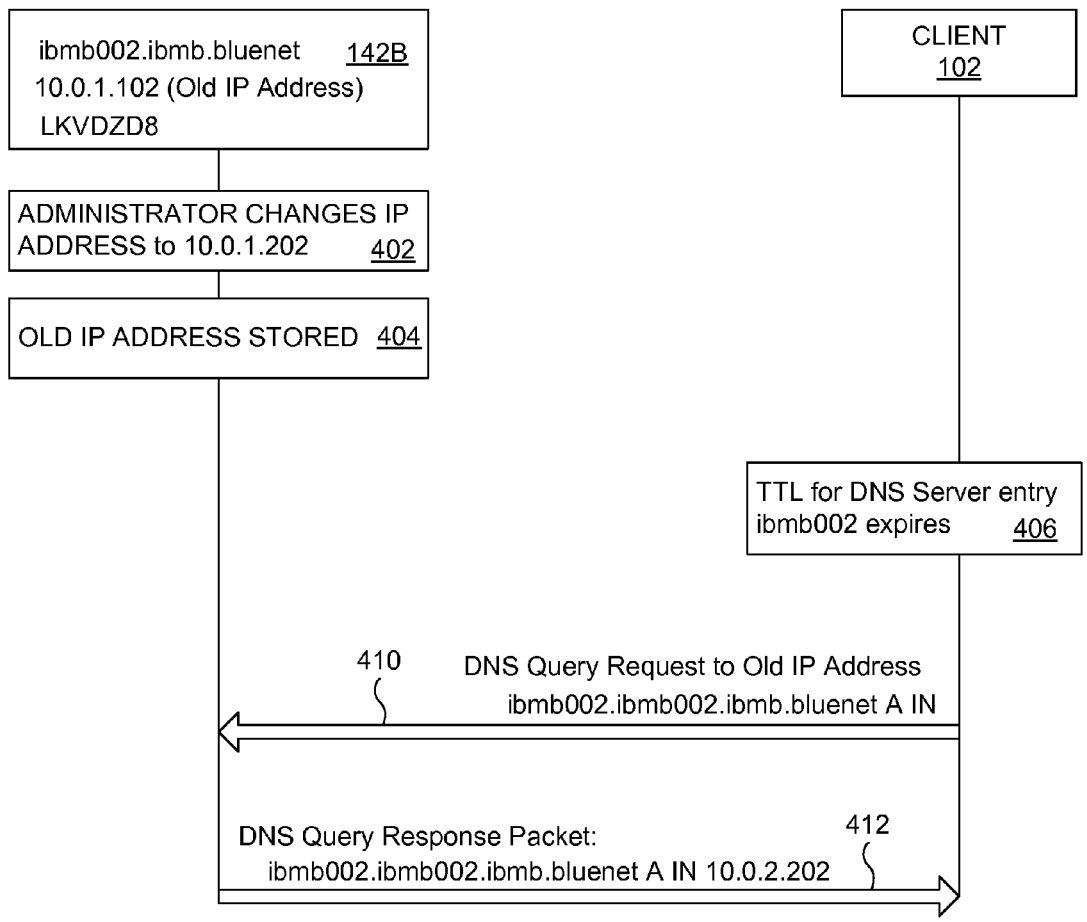
FIG. 4 is a block diagram illustrating an example of an embodiment of the operation of an IP address update on the remote subnet of the private network.

FIG. 4 is a block diagram illustrating an example of an embodiment of the operation of an IP address update on the remote subnet of the private network. Each client 102 on the remote subnet of the private network is configured to send a DNS query request at TTL expiration. If the administrator changes the server IP address, the system is configured store the old IP address until all clients on the remote subnet are updated.

For example, at block 402, the administrator changes the IP address associated with the server from 10.0.1.102 to 10.0.2.202. The server stores the old IP address 402, 10.0.1.102. At TTL expiration 406, the client is configured to send a DNS query request to the old IP address 410, wherein the old IP address in the illustrated example is 10.0.1.102. In response, the server is configured to send a response to packet with the updated IP address 412, wherein the updated IP address in the illustrated example is 10.0.2.202.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the aforementioned, reference is made to private network servers, including distributed DNS servers on the private network. Those skilled in the art will appreciate that the private network servers described in the embodiments herein may serve multiple purposes, such that each server may manage domain names and host applications. In other words, at the very least, the private network servers described herein may function both as an application server and as a DNS server.

In addition, reference is made to a local subnet. It should be understood that the term local subnet is used interchangeably with the term LAN segment to mean that portion of a local area network wherein every device communicates using the same physical layer. Further, repeated reference is made to the private network. Those skilled in the art will appreciate that the networked devices in the private network may communicate with networked devices outside of the private network. Further, those skilled in the art will appreciate that aspects of the embodiments of the invention described herein may transcend the private network and work equally well in a WAN.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for updating IP addresses on a private network, comprising configuring one or more processors to perform an operation, comprising:

receiving an updated IP address on a private DNS server to replace an old IP address;

storing the old IP address on the private DNS server; receiving a DNS query from a remote client addressed to the old IP address associated with the private DNS server;

responding to the remote client with the updated IP address; deleting the old IP address from the private DNS server after all remote clients have stored the updated IP address; and updating the private DNS server network settings with the updated IP address;

wherein the private DNS server determines that all remote clients have stored the updated IP address after an elapsed time period; and wherein the elapsed time period is defined by a user.

2. The computer implemented method of claim 1, wherein the private DNS server determines that all remote clients have stored the updated IP address after the private DNS server receives a client confirmation response from all remote clients, as defined in a remote client list.

3. The computer implemented method of claim 2, wherein the remote client list is generated by analyzing a DNS log on the private DNS server and identifying all unique clients that have previously communicated with the private DNS server.

4. The computer implemented method of claim 1, wherein the operation further comprises broadcasting the updated IP address on a shared LAN segment.

5. A non-transitory computer readable storage medium containing a program, which when executed performs an operation for modifying IP addresses on a private network, comprising:

receiving an updated IP address on a private DNS server to replace an old IP address;

storing the old IP address on the private DNS server;

receiving a DNS query from a remote client addressed to the old IP address associated with the private DNS server;

responding to the remote client with the updated IP address; and deleting the old IP address from the private DNS server after all remote clients have stored the updated IP address;

wherein the private DNS server determines that all remote clients have stored the updated IP address after an elapsed time period; and wherein the elapsed time period is defined by a user.

6. The non-transitory computer readable storage medium of claim 5, wherein the private DNS server determines that all remote clients have stored the updated IP address after the private DNS server receives a client confirmation response from all remote clients, as defined in a remote client list.

7. The non-transitory computer readable storage medium of claim 6, wherein the remote client list is generated by analyzing a DNS log on the private DNS server and identifying all unique clients that have previously communicated with the private DNS server.

8. The non-transitory computer readable storage medium of claim 5, wherein the operation further comprises broadcasting the updated IP address on a shared LAN segment.

9. A system, comprising:

a processor; and a memory containing a program, which when executed by the processor is configured to perform an operation for modifying IP addresses on a private network, comprising:

receiving an updated IP address on a private DNS server to replace an old IP address;

storing the old IP address on the private DNS server;

receiving a DNS query from a remote client addressed to the old IP address associated with the private DNS server;

responding to the remote client with the updated IP address; and deleting the old IP address from the private DNS server after all remote clients have stored the updated IP address;

wherein the private DNS server determines that all remote clients have stored the updated IP address after an elapsed time period; and wherein the elapsed time period is defined by a user.

10. The system of claim 9, wherein the private DNS server determines that all remote clients have stored the updated IP address after the private DNS server receives a client confirmation response from all remote clients, as defined in a remote client list.

11. The system of claim 10, wherein the remote client list is generated by analyzing a DNS log on the private DNS server and identifying all unique clients that have previously communicated with the private DNS server.

12. The system of claim 9, wherein the operation further comprises broadcasting the updated IP address on a shared LAN segment.

* * * * *